Patented July 9, 1940

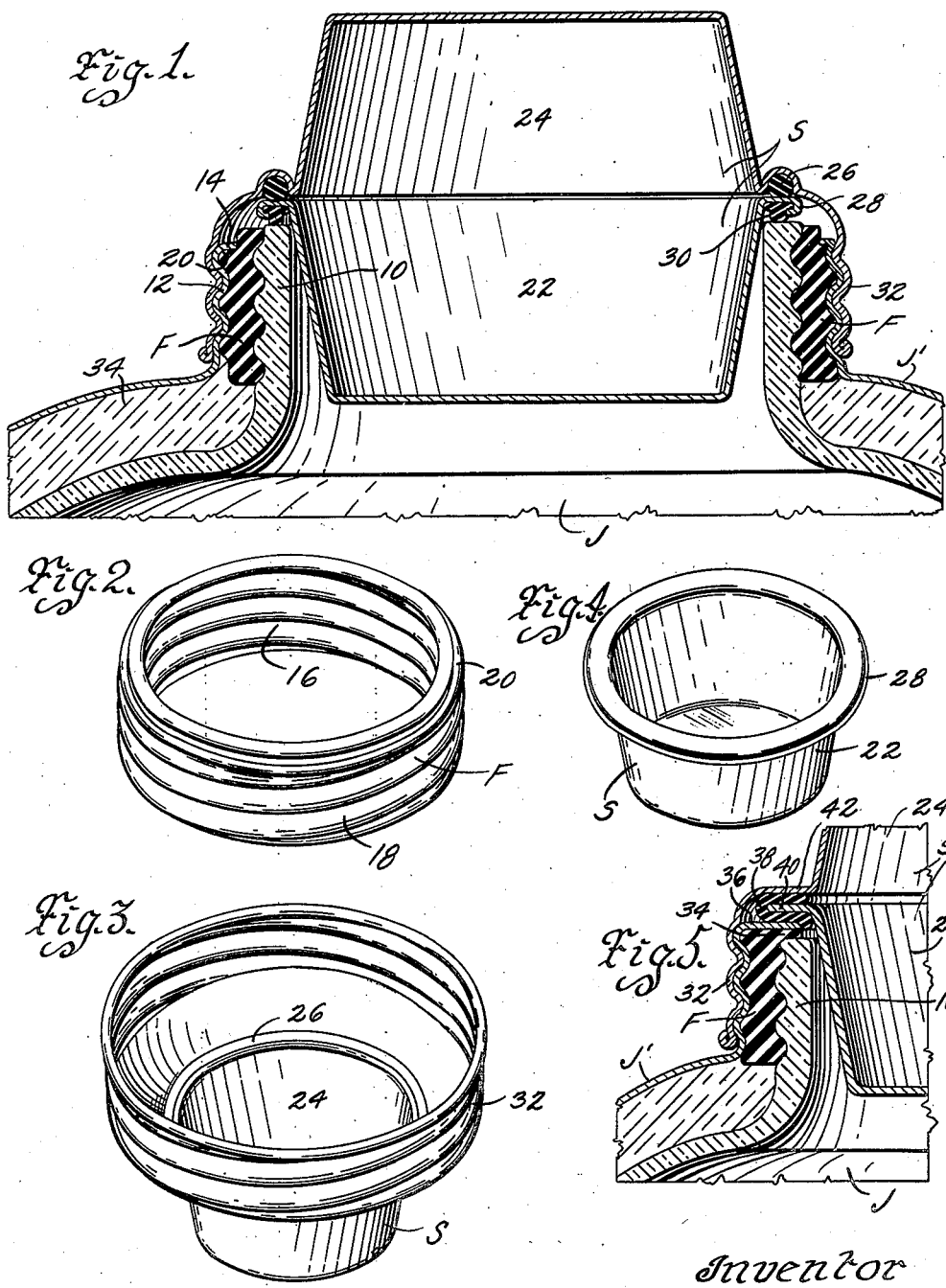

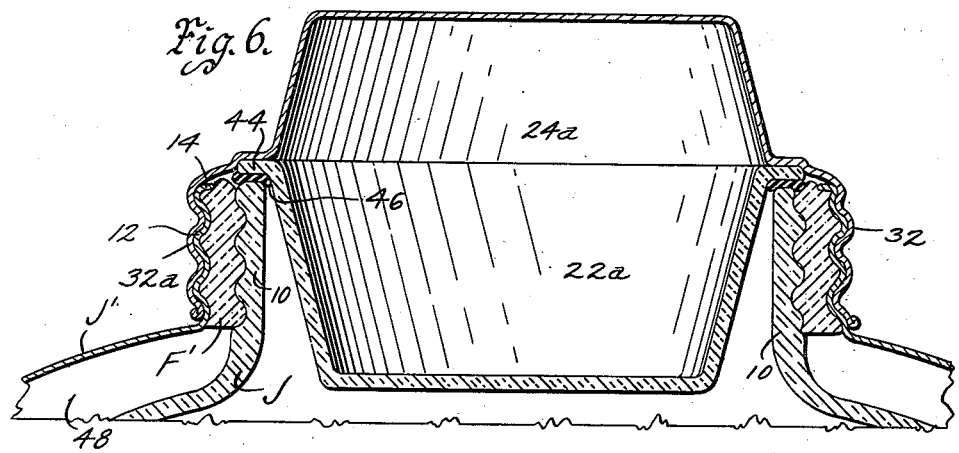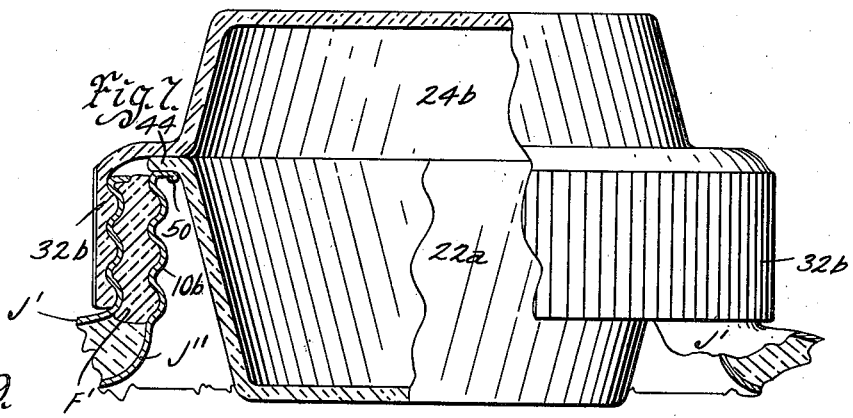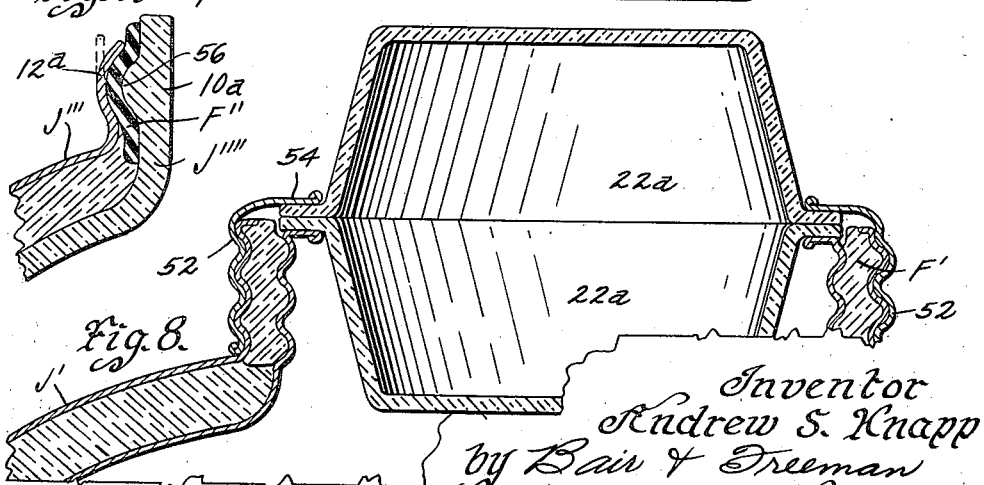

2,207,543

UNITED STATES PATENT OFFICE 2,207,543

INSULATED CONTAINER AND STOPPER

Andrew S. Knapp, St. Louis, Mo., assignor to Knapp-Monarch Company, St. Louis, Mo., a corporation of Missouri Application June 9, 1937, Serial No. 147,269

4 Claims. (Cl. 215—13)

An object of my invention is to provide an insulated container and stopper therefor, which are comparatively simple and inexpensive to manufacture.

A further object is to provide a container of the usual type having an inner jug which may be of frangible material or sheet metal or the like and an outer jacket therefor, means being provided according to my invention to seal the space between the neck of the jug and the neck of the jacket against passage of heat to and from the space between them. This means provides an air seal and when made of resilient material, such as rubber, serves not only as a heat insulating seal but a shock absorber against any damage being done to the inner jug when made of frangible material and when the neck of the jacket is struck against a rigid object.

A further object is to provide an inner jug with an externally threaded neck or one formed with grooves or projections and an outer jacket formed of sheet metal and having a neck which may also be formed with screw-threads or formed of another shape to increase the effective contact between the necks and a filler ring, the filler ring serving as a support for the inner jug when an air space is provided for heat insulation between the jug and the jacket, and heat insulating material in such space serving as a support for the jug when such heat insulating material is used.

Still another object is to provide an inner jug with an externally threaded neck and an outer jacket with an internally threaded neck, a filler ring which is internally and externally screw-threaded being screwed onto the jug neck and screwed into the jacket neck to connect the two necks together, the filler ring being of heat insulating material to minimize heat leakage from the space between the jug and jacket, and such construction permitting of ready and economical assembly.

Still a further object is to provide in connection with an insulated jug, a stopper construction which provides an air space for heat insulating purposes and at the same time gives the user a pair of cups for convenience when consuming the contents of the jug.

A further object is to so associate the pair of cups together that they form an air chamber and the two are readily sealed relative to the jug by screwing a peripheral flange of one of them over the jacket neck.

A further object is to provide a gasket connection between the two cup elements, which prevents the transmission of heat through a metallic path and thus minimizes the leakage of heat from or to the contents of the jug.

Another object is to provide a modified construction in which the cup elements may be made of heat insulating material, thus eliminating the necessity of a gasket connection between them and to provide the cup elements of similar shape, if desired, in which case they may be connected to the jug by a separate ring.

With these and other objects in view, my invention consists in the construction, arrangement and combination of the various parts of my insulated container and stopper, whereby the objects contemplated are attained, as hereinafter more fully set forth, pointed out in my claims, and illustrated in the accompanying drawings, in which:

Figure 1 is a sectional view through the neck of an insulated jug embodying my invention.

Figure 2 is a perspective view of the filler ring, which I use between the neck of the jug and jacket.

Figure 3 is a perspective view of an outer cup-shaped stopper element.

Figure 4 is a similar perspective view of an inner cup-shaped stopper element.

Figure 5 is a sectional view similar to a portion of Figure 1, showing a slightly modified construction.

Figure 6 is a sectional view similar to Figure 1 showing a modified construction in which the inner cup is made of heat insulating material and in which the filler ring is of heat insulating material but not necessarily resilient material.

Figure 7 is a similar view in which both cups are of heat insulating material.

Figure 8 is a similar sectional view in which two similar cups of insulating material are held in position on the jug by a retainer ring.

Figure 9 is a sectional view similar to a portion of Figure 1, showing a filler ring between the jug neck and the jacket neck which coacts with projections thereof rather than being screwed into position.

On the accompanying drawings, I have used the reference character J to indicate a jug or inner container. Jugs of this character are usually made of frangible material, such as porcelain or glass.

A jacket J' is provided for enclosing the jug J, these jackets usually being made of sheet metal.

The jug J has a neck 10 which is externally screw-threaded. The jacket J' has a neck 12, which is formed with a screw-thread, so that the neck is both internally and externally threaded.

At the upper end of the neck 12 is an inturned flange 14.

Interposed between the necks 10 and 12 is a filler ring F formed of shock absorbing and heat insulating material, such as rubber.

The ring F is internally threaded as indicated at 16 and externally threaded as indicated at 18.

The filler ring F is provided with a shoulder 20 at its upper end with which the flange 14 is adapted to engage.

The parts J, J' and F are assembled by screwing the ring F on the neck 10 and then screwing the jacket J' in position with its neck surrounding the filler ring F. In the final position of the parts, the flange 14 of the jacket J' rests against the shoulder 20 to form an air tight connection therewith.

The relative sizes of the necks 10 and 12 and of the filler ring F are such that the parts fit snugly together to prevent any heat leakage by way of an air space, and to suitably support the jug J relative to the jacket J'.

For my jug J, I provide a stopper S, comprising an inner cup-shaped member 22 and an outer cup-shaped member 24. The member 24 is inverted as shown in Figure 1, and the two members 22 and 24 are separated against heat leakage from one to the other by a gasket 26, such as a ring of rubber or the like. Also interposed between an upper hooked peripheral flange 28 of the cup member 22 and the upper end of the neck 10 of the jug J is a gasket 30 for sealing the jug against spillage of its contents. The gaskets 26 and 28 may be retained in position by any suitable means for connecting the stopper S to the insulated jug. By way of illustration, I show a threaded peripheral flange 32 on the cup member 24 adapted for coaction with the external threads of the neck 12 of the jacket J'.

When the parts J, J' and F are assembled by threading them together as above described, the filler ring F serves to suspend the jug J relative to the jacket J' and the space between the two below the filler ring F is filled with heat insulating material, such as rock wool or the like, indicated at 34 on the drawings.

The cup members 22 and 24 are so formed that they normally retain the gaskets 26 and 30 in position against accidental displacement or loss.

When the stopper S is in position on the jug, the space within the cup members 22 and 24 is closed by the gasket 26, and the dead air space thus resulting serves as an efficient insulator against the transmission of heat from within or without the jug J, thus keeping its contents warm or cold for a longer period of time.

The filler ring F minimizes the transmission of heat to or from the jacket J' and the atmospheric air relative to the jug neck 10.

When the stopper S is removed from the jug, due to its construction, two drinking cups are provided. This is a substantial advantage as far as convenience is concerned, without complicating the construction of the stopper or making it more expensive to manufacture than the usual air chamber type of stopper.

As shown in Figure 5, the filler F may have an in-turned flange 34 at its upper end contacting with the top of the jug neck 10. The jacket J' is shown with an in-turned flange 36 contacting with the upper surface of the flange 34. Instead of providing the two gaskets 26 and 30, a single gasket 38, which is U-shaped in cross section, may be utilized for enclosing a flange 40 around the upper edge of the inner cup member 22. One portion of this gasket is interposed between the cup member 22 and the flange 36 when the stopper is closed, while the other portion thereof is confined between a flange 42 of the outer cup member 24 and the flange 40. When the threaded peripheral flange 32 of the cup member 24 is screwed onto the neck 12 of the jacket J', the gasket 38 thus serves as a double seal and takes the place of both gaskets 26 and 30.

In Figure 6, I illustrate an inner cup 22a and an outer cup 24a. The cup 22a is made of heat insulating material such as Bakelite or the like and has a peripheral flange 44. A gasket 46 is interposed between the neck of the jug J and the flange 44 to seal the jug against leakage of its contents. The cup 24a has the threaded portion 32a to fit on the threads of the jacket J' but there is no gasket between the flange 44 and the cup 24a. Since the cup 22a is of insulating material, such gasket is not necessary as when using two cups of metal, as shown in Figure 1. The filler ring F' is illustrated as being of heat insulating material such as Bakelite, fiber or the like and thus effectively serves as a heat insulating connection without the advantage of being a shock absorbing connection. As shown in this figure, the filler F' serves to seal the space 48 between the jacket and jug, which may be an air space instead of being filled with insulating material as in the preceding figures.

In Figure 7, I show a cup 24b, which is made of heat insulating material instead of sheet metal. It has a cylindrical portion 32b threaded on the threads of the jacket J'. As shown in this figure, the inner jug J'' may be of sheet metal or similar material instead of frangible material, and thus it is not necessary for the filler ring F' to be of resilient material. The jug J'' has a peripheral flange 50 with which the flange 44 of the inner cup 22a engages and due to the resiliency of the metal, a gasket such as at 46 in Figure 6 need not be used.

In Figure 8, I have shown how two similar cups 22a may be used in place of dis-similar cups. The two cups are held in their jug closing position by a retainer ring 52 threaded on the jacket J'. The ring 52 has a flange 54 engaging the flange 44 of the outer cup member 22a. This arrangement permits an economy in manufacture, since separate dies do not have to be provided for two different types of cups.

In Figure 9, I illustrate a jug J'''' having a neck 10a. A peripheral bead or projection 56 is formed thereon and a filler ring F''' is shown in the form of a band of rubber or the like. This is placed over the bead 56 and the upper edge of the jacket J''' is then spun over the filler F'''. The initial position of the upper edge of the jacket before it is spun into its final position is shown by dotted lines. Obviously peripheral grooves instead of threads or projections such as shown in Figure 9 may be formed in or on the jug and jacket necks in order to provide an effective contact between the filler ring and the necks. The filler ring connection of course must be so designed that upward and downward shifting of one neck relative to the other is eliminated.

Some changes may be made in the construction and arrangement of the parts of my insulated container and stopper without departing from the real spirit and purpose of my invention, and it is my intention to cover by my claims, any modified forms of structure or use of mechanical equivalents, which may be reasonably included within their scope.

I claim as my invention:

1. In a device of the class described, inner and outer spaced containers, each having a neck, said necks being peripherally threaded, and a heat insulating and shock absorbing filler ring threaded on both sides thereof threadably interposed between said necks and fitting the threads thereof.

2. In an insulated jug structure, a jug having a threaded neck, a jacket for enclosing said jug and spaced therefrom, said jacket having a threaded neck surrounding and spaced from the neck of said jug, a filler ring threaded into said jacket neck and threaded onto said jug neck, said ring having a shoulder adjacent its upper end and said jacket having a flange engaging the top of said shoulder to determine the position of said filler ring with relation to said jacket.

3. In an insulating jug device of the class described including a closure for the jug, the combination of inner and outer spaced containers, each having a neck, said necks being peripherally grooved, a heat insulating and shock absorbing filler ring interposed between said necks and fitting the threads thereof, said filler ring having an in-turned flange at its upper end projecting over the upper end of said jug neck, said jacket having an in-turned flange at its upper end overlying said in-turned flange of said filler ring spaced from the end of the jug neck by said flange on the ring and providing a contact rim for said stopper.

4. In an insulated jug structure including an internal jug and a threaded closure therefor, the combination of an externally threaded neck for said jug, a jacket surrounding said jug and spaced therefrom having an internally and externally threaded neck surrounding and spaced from the threaded neck of said jug, a filler ring of resilient material threaded into said jacket neck and simultaneously threaded in contact with said jug neck, said ring spanning the distance between the necks of said jacket and said jug, the external threads on said jacket neck being adapted to provide engagements for the threaded closure of said jug.

ANDREW S. KNAPP.